US009832550B2

(12) United States Patent
McLaren et al.

(10) Patent No.: US 9,832,550 B2
(45) Date of Patent: Nov. 28, 2017

(54) RADIX ENHANCEMENT FOR PHOTONIC PACKET SWITCH

(71) Applicant: Hewlett-Packard Development Company, L.P., Fort Collins, CO (US)

(72) Inventors: Moray McLaren, Bristol (GB); Raymond G Beausoleil, Palo Alto, CA (US); Norman Paul Jouppi, Palo Alto, CA (US); Marco Fiorentino, Palo Alto, CA (US); Alan Lynn Davis, Coalville, CA (US); Naveen Muralimanohar, Palo Alto, CA (US); Sheng Li, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 183 days.

(21) Appl. No.: 14/764,960

(22) PCT Filed: Jan. 31, 2013

(86) PCT No.: PCT/US2013/024135
§ 371 (c)(1),
(2) Date: Jul. 30, 2015

(87) PCT Pub. No.: WO2014/120203
PCT Pub. Date: Aug. 7, 2014

(65) Prior Publication Data
US 2015/0373433 A1    Dec. 24, 2015

(51) Int. Cl.
    *H04J 14/02*        (2006.01)
    *H04Q 11/00*        (2006.01)
(52) U.S. Cl.
    CPC .......... *H04Q 11/0005* (2013.01); *H04J 14/02* (2013.01); *H04Q 11/0003* (2013.01);
    (Continued)

(58) Field of Classification Search
    CPC . H04J 14/02; H04Q 11/0003; H04Q 11/0066;
              H04Q 11/0071; H04Q 11/0005;
    (Continued)

(56) References Cited

U.S. PATENT DOCUMENTS 5,475,682 A * 12/1995 Choudhury ......... H04L 12/5602
                                                     370/229
6,559,989 B1 * 5/2003 Kim ................... H04Q 11/0005
                                                     359/108
(Continued)

FOREIGN PATENT DOCUMENTS

CN    1489323          4/2004
EP    2541969 A1       6/2011

OTHER PUBLICATIONS

Blumenthal D J et al: "Photonic Packet Switches: Architectures and experimental Implementations", Proceedings of the IEEE, IEEE. New York, US, vol. 82, No. 11, Nov. 30, 1994 (Nov. 30, 1994), pp. 1650-1667, XP000491597.
(Continued)

Primary Examiner — Tesfaldet Bocure
(74) Attorney, Agent, or Firm — Tarolli, Sundheim, Covell & Tummino L.L.P.

(57) ABSTRACT

A system can include an optical multiplexer to combine a plurality of optical input signals having respective wavelengths into a wide-channel optical input signal that is provided to an input channel. The system also includes a photonic packet switch comprising a switch core and a plurality of ports defining a switch radix of the photonic packet switch. The input channel and an output channel can be associated with one of the plurality of ports. The photonic packet switch can process the wide-channel optical input signal and can generate a wide-channel optical output signal that is provided to the output channel. The system further includes an optical demultiplexer to separate the wide-
(Continued)

channel optical output signal into a plurality of optical output signals having respective wavelengths. The optical multiplexer and the optical demultiplexer can collectively provide the system with a radix greater than the switch radix.

20 Claims, 4 Drawing Sheets

(52) U.S. Cl.
CPC ..... *H04Q 11/0066* (2013.01); *H04Q 11/0071* (2013.01); *H04Q 2011/002* (2013.01); *H04Q 2011/0016* (2013.01); *H04Q 2011/0039* (2013.01)

(58) Field of Classification Search
CPC ..... H04Q 2011/016; H04Q 2011/0039; H04Q 2011/002
USPC .............................................. 398/45, 48, 49
See application file for complete search history.

(56) References Cited

U.S. PATENT DOCUMENTS

| | | | |
|---|---|---|---|
| 6,606,427 B1 | 8/2003 | Graves et al. | |
| 6,792,182 B1 | 9/2004 | Davies et al. | |
| 7,181,140 B2* | 2/2007 | Ovadia | H04Q 11/0066 |
| | | | 370/360 |
| 7,228,071 B2 | 6/2007 | Park | |
| 7,259,031 B1* | 8/2007 | Dickinson | B82Y 20/00 |
| | | | 438/23 |
| 7,848,649 B2* | 12/2010 | Maciocco | H04Q 11/0066 |
| | | | 398/43 |
| 8,121,478 B2 | 2/2012 | Kas et al. | |
| 8,660,427 B2* | 2/2014 | Ovadia | H04Q 11/0066 |
| | | | 398/47 |
| 8,731,401 B2* | 5/2014 | Chen | H04J 14/0254 |
| | | | 398/46 |
| 8,902,488 B2* | 12/2014 | Graham | H04Q 11/0005 |
| | | | 359/276 |
| 2009/0324220 A1 | 12/2009 | Perkins et al. | |
| 2012/0114282 A1 | 5/2012 | Grover | |
| 2012/0121262 A1 | 5/2012 | Andriolli et al. | |
| 2012/0148242 A1 | 6/2012 | Chen et al. | |
| 2012/0237217 A1 | 9/2012 | Spivey et al. | |
| 2014/0334819 A1* | 11/2014 | Mehrvar | H04Q 11/0003 |
| | | | 398/51 |

OTHER PUBLICATIONS

Extended European Search Report dated Sep. 21, 2016; EP Application No. 13873163.3; pp. 13.
Rodney S Tucker et al: "Invited Paper Joint Special Issue on Photonics in Switching: Systems and Devices Photonic Packet Switching: An Overview", Feb. 28, 1999 (Feb. 28, 1999), XP055296801.
Shun Yao: "IEEE Communications Magazine @BULLET Feb. 2000 84 Advances in Photonic Packet Switching : An Overview", Dec. 31, 2000 (Dec. 31, 2000), XP055296803.
Chao, H.J. et al., Next Generation Routers, Sep. 2002, pp. 1518-1558, vol. 9, No. 90.
International Search Report and Written Opinion, dated Jan. 31, 2013, PCT Patent Application No. PCT/US2013/024135, 13 pages.

* cited by examiner

RADIX ENHANCEMENT FOR PHOTONIC PACKET SWITCH

BACKGROUND

Current network packet switches receive packet data from another switch or a terminal node and forward that packet to the destination terminal node or to another intermediate switch. The network packet switches predominantly use electronic input/output (I/O) connections at the packet switches. Many network packet switches are packaged in a single application specific integrated circuit (ASIC) and are thus are limited in external bandwidth by both power and pin-count limitations at the respective package.

DETAILED DESCRIPTION

This disclosure relates to radix enhancement for photonic packet switches that utilize optical input/output connections and a switch core. To minimize latency in large scale networks, it is desirable to increase the port count for a given photonic packet switch (e.g., switches connecting to a larger possible number of discrete sources and destinations). Integrated photonics within the photonic packet switch allows the combination of high bandwidth and high port count through the use of dense wavelength division multiplexing (DWDM) of each of the optical inputs and outputs to or from the packet switch. By utilizing an arrangement of optical multiplexers and demultiplexers in conjunction with the photonic packet switch, a single optical switch module can be provided that is capable of supporting an increased number of network input and output connections without also increasing the number of physical I/O connections to the switch.

Figure 1:
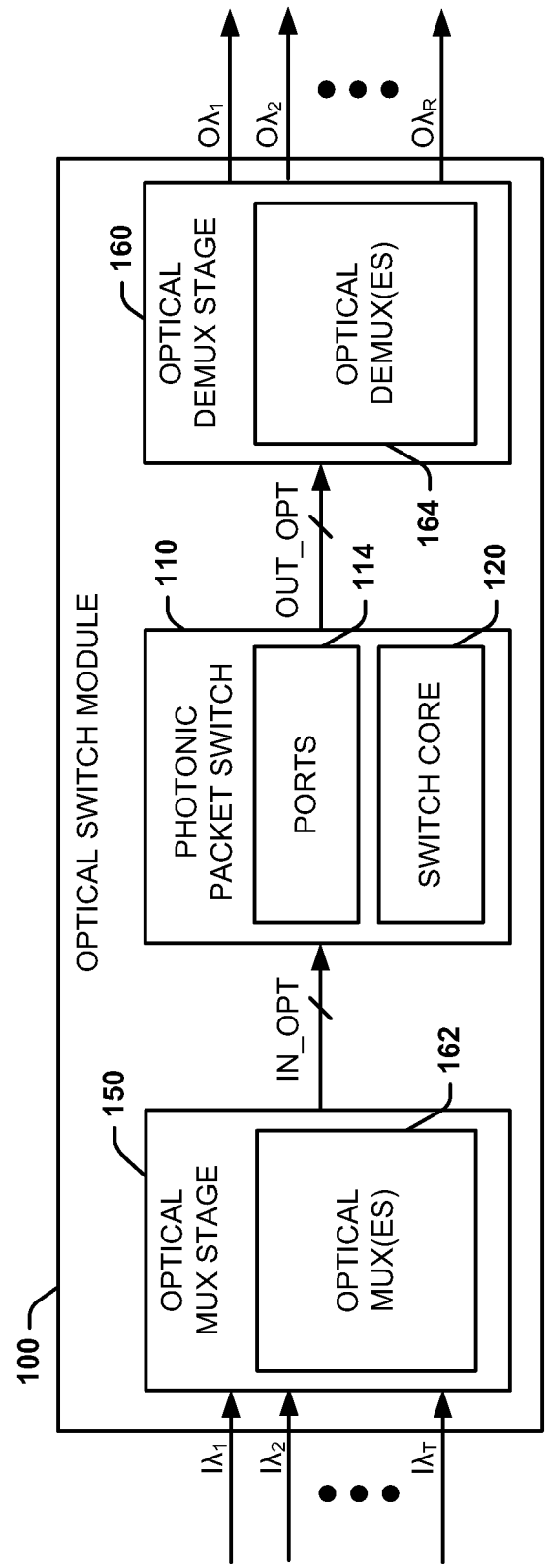
FIG. 1 illustrates an example of an optical switch module.

FIG. 1 illustrates an example of an optical switch module 100. The optical switch module 100 employs optical multiplexing and demultiplexing to increase the radix of a photonic packet switch 110, which can be included as part of the optical switch module 100. As described herein, the term "radix" refers to a number of ports 114 of the photonic packet switch 110. Thus, the number of ports 114 of the photonic packet switch 110 relative to the fan-in and fan-out characteristics of the multiplexing and demultiplexing, as described herein, can correspond to the switch radix. As described herein, a given port 114 includes two separate and independent data channels, one input channel and one output channel, for example. The photonic packet switch 110 also includes a switch core 120 to process input data packets derived from a plurality of optical input signals IN_OPT that can each be provided to the switch core 120 from a plurality of input channels, such that each of the plurality of optical input signal IN_OPT can be associated with one of the plurality of ports 114. In some examples, the switch core 120 can be configured as an electrical switch core. In other examples, the switch core can be configured as an optical switch core or as a hybrid electrical and optical core.

As an example, each of the ports 114 can include an optical-to-electrical (O/E) converter, an electrical data buffer, and/or routing logic. The switch core 120 can have a control path and a data path, wherein the control path handles arbitration, flow control, and error detection and recovery, for example. The data path moves data (e.g., a packet) from an input channel to a corresponding output channel associated with the ports 114, such as determined by the routing logic. Thus, each of the ports 114 can also include an electrical-to-optical (E/O) converter to convert the electrical signals provided from the switch core 120 to optical signals for transmission from a respective output channel.

The optical switch module 100 can also include an optical multiplexer (i.e., MUX) stage 150 and an optical demultiplexer (i.e., DEMUX) stage 160. In the example of FIG. 1, the optical multiplexer stage 150 includes at least one optical multiplexer 162 that is coupled to a respective input channel associated with the ports 114 (e.g., via an optical waveguide, such as an optical fiber). The optical multiplexer(s) 162 each include a set of optical inputs to increase the switch radix of the photonic packet switch 110 by multiplexing a respective set of optical input signals of different wavelengths, demonstrated in the example of FIG. 1 as optical input signals $I\lambda_1$ through $I\lambda_T$, where T is a positive integer denoting the number of separate input signals for a given multiplexer 162. Each of the optical input signals $I\lambda_1$ through $I\lambda_T$ can be associated with one or more different wavelengths (e.g., wavelength division multiplexed (WDM) signals, such as course WDM or DWDM signals). As an example, the optical input signals $I\lambda_1$ through $I\lambda_T$ can be provided from a variety of sources, such as optical transmitter terminals and/or optical routers.

In addition, the optical demultiplexer stage 160 includes at least one optical demultiplexer 164 that is coupled to a respective output channel associated with the ports 114 (e.g., via an optical waveguide). The optical demultiplexer(s) 162 each similarly include a set of optical outputs to increase the switch radix of the photonic packet switch 110 by demultiplexing a plurality of optical output signals OUT_OPT, such as each corresponding to a respective one of a plurality of output channels, into optical output signals of different wavelengths, demonstrated in the example of FIG. 1 as optical output signals $O\lambda_1$ through $O\lambda_R$, where R is a positive integer denoting the number of output signals from a given demultiplexer 162. Each of the optical output signals $O\lambda_1$ through $O\lambda_R$ can likewise include one or more different wavelengths. The optical output signals $O\lambda_1$ through $O\lambda_R$ can be provided to a variety of destinations, such as optical receiver terminals and/or optical routers for further processing and/or routing. As one example, T and R could be equal, such that each of the optical output signals $O\lambda_1$ through $O\lambda_R$ can correspond to a respective one of the optical input signals $I\lambda_1$ through $I\lambda_T$. As another example, the number of optical input signals $I\lambda_1$ through $I\lambda_T$ can differ from the number of optical output signals $O\lambda_1$ through $O\lambda_R$.

By way of further example, the optical multiplexer(s) 162 can each be configured to receive a respective set of the optical input signals $I\lambda_1$ through $I\lambda_T$ as multiple (e.g., T) thin channels and to combine them into a single wide channel that is provided to the packet switch 110 as one of the optical input signals IN_OPT. As used herein, the term "wide channel" refers to an optical signal having a given number of wavelengths (e.g., 16), and the term "thin channel" refers to an optical signal having a number of wavelengths that is less than the given number of wavelengths in the wide channel (e.g., 1, 2, 4). The combination of the number of wavelengths of the thin channels into the wide channel for a given optical multiplexer 162 can be based on a "fan-in" factor, such that a given wide-channel signal having sixteen wavelengths can be provided from one of the optical multiplexers 162 having a fan-in factor of four as a combination of four thin channels that each include four wavelengths. In a similar but opposite manner, the optical demultiplexer(s) 164 can thus each be configured to receive an optical output signal OUT_OPT that is a wide-channel signal from the photonic packet switch 110 and to separate the wide-channel signal into the respective multiple thin channels corresponding to optical output signals $O\lambda_1$ through $O\lambda_R$. Similar to as described regarding the optical multiplexer(s) 162, the number of wavelengths of thin channels that can be split from the wide channel can be based on a "fan-out" factor.

In addition, the ports 114 can each be configured to receive wide-channel optical input signals IN_OPT and provide wide-channel optical output signals OUT_OPT. However, the wide-channel optical input signals IN_OPT are not limited to being provided by an optical multiplexer 162, and the wide-channel optical signals OUT_OPT are not limited to being provided to an optical demultiplexer 164. Instead, in some examples, the wide-channel optical input signals IN_OPT can be provided directly from an optical source outside of the optical switch module 100. Additionally, the wide-channel optical output signals OUT_OPT can be provided directly to an optical receiver outside of the optical switch module 100. The mode of operation for each input and output channel (e.g., either receiving/transmitting a wide channel directly from/to a source or from/to a multiplexer/demultiplexer) can be based on configuration settings or a control register in the photonic packet switch 110. Accordingly, each of the ports 114 can be selectively configured to operate to increase the radix of the photonic packet switch 110 or to operate as a high-bandwidth DWDM port.

By combining the photonic packet switch 110 and switch core 120 with integrated CMOS photonics and further employing the optical multiplexer/demultiplexer stages 150 and 160, the optical switch module 100 can function as a very high port count switch, in one example, or as a high port count switch with high-bandwidth DWDM ports in another example. Thus, the optical switch module 100 can include any number of multiplexers and demultiplexers connected to respective input and output channels of the packet switch 110. The configuration and number of multiplexers and demultiplexers can increase the switch radix according to the respective fan-in and fan-out factors of the optical multiplexer(s) 162 and optical demultiplexer(s) 164 employed.

Figure 2:
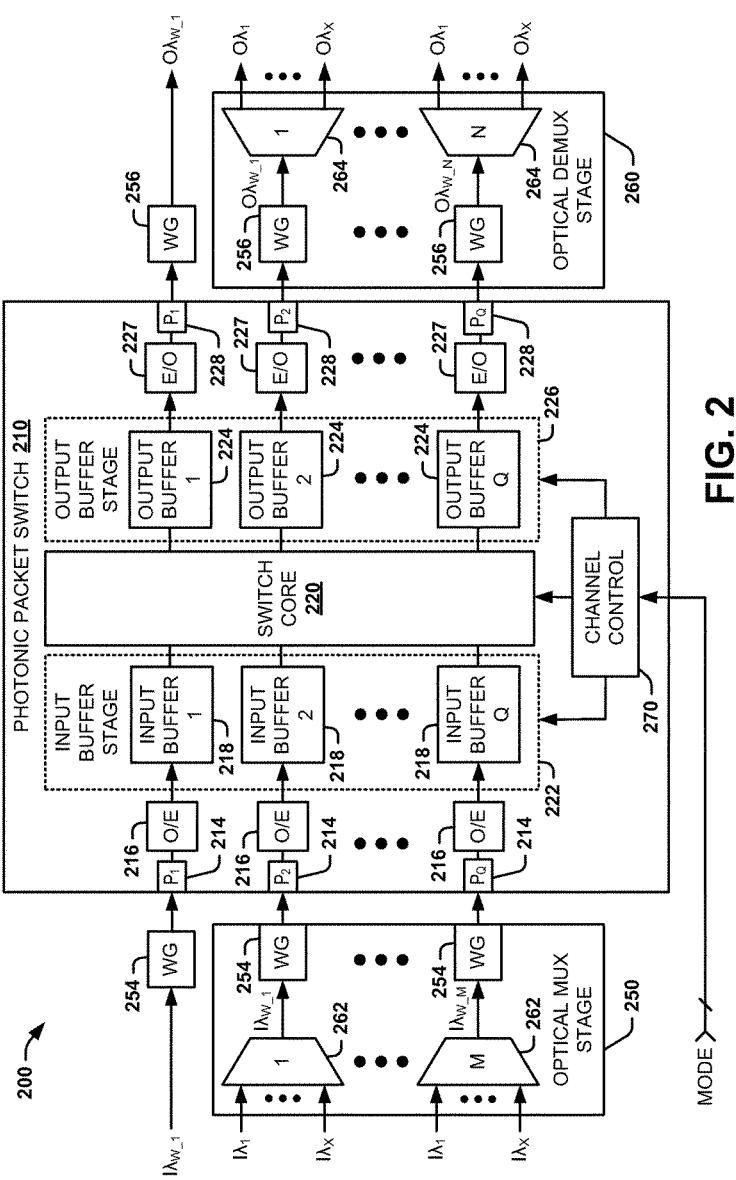
FIG. 2 illustrates another example of an optical switch module.

FIG. 2 illustrates another example of an optical switch module 200. The optical switch module 200 can be implemented in any of a variety of optical applications that implements packet switching. As an example, the optical switch module 200 can be provided on an integrated substrate. Similar to as described previously in the example of FIG. 1, the optical switch module 200 employs optical multiplexing and demultiplexing to increase the effective radix of a photonic packet switch 210. Components to implement such multiplexing and demultiplexing can be included as part of the optical switch module 200.

The photonic packet switch 210 includes a switch core 220 to process data packets in input data signals that are provided to a plurality of input channels 214, demonstrated as numbering from $P_1$ to $P_Q$ in the example of FIG. 2, where Q is a positive integer. Each of the input channels 214 can be associated with a port associated with the photonic packet switch 210, such that the photonic packet switch 210 includes Q ports (i.e., has a radix related to the number of sources that feed Q ports). As an example, the switch core 220 can be configured as an electrical switch core, but could instead be configured as an optical switch core. The photonic packet switch 210 also includes a plurality of O/E converters 216 that are coupled to the respective optical input channels 214 and are configured to convert the optical input signals into corresponding electrical signals. The O/E conversion could be performed by a photodiode, for example. The electrical signals are each provided to a respective one of a plurality of input buffers 218 in an input buffer stage 222. The input buffers 218 can store the data packets provided by the input data signals, such that the data packets can be processed by the switch core 220. As an example, the switch core 220 can be configured as an electrical switch core to provide processing of the data packets in an electrical data path. As another example, the switch core 220 can be configured as an optical switch core to provide processing of the data packets in a photonic data path. For example, the photonic packet switch 210 could thus further include E/O converters between the input buffers 218 and the switch core 220 to provide processing of the data packets in the photonic data path.

The switch core 220 can include a control path and a data path, wherein the control path handles arbitration, flow control, and error detection and recovery, for example. The data path moves the data packets from an input channel 214 to a corresponding one of a plurality of output channels 228, demonstrated as numbering from $P_1$ to $P_Q$ in the example of FIG. 2, such as determined by the routing logic. In the example of FIG. 2, the switch core 220 can employ routing logic to provide the data packets to a plurality of output buffers 224 of an output buffer stage 226. The output data packets stored in the output buffers 224 can be provided (e.g., as packets) to respective E/O converters 226. Each of the E/O converters 226 can be coupled to convert electrical data from a respective one of the output buffers 224 to a corresponding optical data signal that is provided to a respective one of the plurality of output channels 228. Such E/O conversion could be performed by direct modulation of a laser or by indirect modulation of a (potentially shared) laser source, for example. Each of the output channels 228 can correspond to a respective one of the input channels 214, such that a given one of the input channels 214 and a given one of the output channels 228 can collectively form a given port of the photonic packet switch 210. Accordingly, the output signals can be provided as optical output signals from the respective output channels 228 of the photonic packet switch 210.

The optical switch module 200 can also include an optical multiplexer (MUX) stage 250 and an optical demultiplexer (DEMUX) stage 260. In the example of FIG. 2, the optical multiplexer stage 250 includes a plurality M of optical multiplexers 262 that are each coupled to a respective one of the input channels 214 via a waveguide 254, where M is a positive integer that is less than or equal to Q. The optical multiplexers 262 each include a set of X optical inputs, where X is a positive integer, that receive a respective plurality of optical input signals $I\lambda_1$ through $I\lambda_X$ that can each have a separate wavelength or band of wavelengths (e.g., via WDM). While the example of FIG. 2 demonstrates that each of the optical multiplexers 262 receives the X optical input signals, it is to be understood that the optical multiplexers 262 are not limited to each receiving the same quantity of optical input signals. Each of the optical input signals $I\lambda_1$ through $I\lambda_X$ can be provided as a thin-channel signal, such that each of the optical multiplexers 262 are configured to combine the optical input signals $I\lambda_1$ through $I\lambda_X$ into a single wide-channel optical signal, demonstrated in the example of FIG. 2 as optical input signals $I\lambda_{W\_1}$ through $I\lambda_{W\_M}$, based on the fan-in factor of each of the respective optical multiplexers 262. Each of the optical input signals $I\lambda_{W\_1}$ through $I\lambda_{W\_M}$ thus can drive a respective optical input channel $P_1$ to $P_Q$.

Similar to the optical multiplexer stage 250, in the example of FIG. 2, the optical demultiplexer stage 260 includes a plurality N of optical demultiplexers 264 that are each coupled to a respective one of the output channels 228 via a waveguide 256, where N is a positive integer that is less than or equal to Q. As an example, N and M can be equal, such that each of the multiplexed input channels 214 can be associated with a given one of the demultiplexed output channels 228 to provide symmetric across the ports of the packet switch 210. However, in other examples, it is to be understood that the N and M could be unequal. The optical demultiplexers 264 each include a set of X optical outputs that provide a respective plurality of optical output signals $O\lambda_1$ through $O\lambda_X$ that can each have a separate wavelength or band of wavelengths, such as corresponding to the respective optical input signals $I\lambda_1$ through $I\lambda_X$ provided to a given one of the optical multiplexers 262. Similar to as described previously regarding the optical multiplexers 262, each of the optical demultiplexers 264 is not limited to providing the same quantity of optical output signals. Each of the optical demultiplexers 264 is configured to provide the optical output signals $O\lambda_1$ through $O\lambda_X$ as thin-channel signals based on optically demultiplexing a single wide-channel optical output signal, demonstrated in the example of FIG. 2 as optical output signals $O\lambda_{W\_1}$ through $O\lambda_{W\_N}$ into thinner optical signals. The number of one or more wavelengths in each of the output signals $O\lambda_1$ through $O\lambda_X$ relative to the number of wavelengths in the wide-channel signals $O\lambda_{W\_1}$ through $O\lambda_{W\_N}$ corresponds to a fan-out factor of each of the respective optical demultiplexers 264.

The photonic packet switch 210 thus provides a manner in which a plurality of the thin-channel optical input signals can be combined into a plurality of fewer wide-channel optical input signals. Each of such wide-channel optical input signals is provided to an input channel 214, and a plurality of wide-channel output signals provided from respective output channels 228 are demultiplexed into a greater plurality of thin-channel optical output signals. Accordingly, the optical multiplexer stage 250 and the optical demultiplexer stage 260 cooperate to increase the radix of the photonic packet switch 210 as to provide the capability of switching between a greater quantity of ports than typical photonic packet switches.

There are several approaches that can be utilized to implement the optical multiplexing and demultiplexing functions in the optical multiplexer stage 250 and demultiplexer stage 260. As an example, the multiplexers 262 and/or the demultiplexers 264 can be implemented as one or more of silicon arrayed waveguide gratings (AWGs), micro-ring resonator filters, optical interleavers, and multimode interference (MMI) receivers to provide the respective multiplexer and/or demultiplexer functions. As an example, the optical multiplexers 262, the optical demultiplexers 264, and the associated respective waveguides 254 and 256 can be fabricated in an integrated substrate on which the photonic packet switch 210 is provided, such that the optical switch module 200 can be provided in a single integrated package to provide the switching of the optical input signals and the optical output signals between the ports of the photonic packet switch 210.

Figure 3:
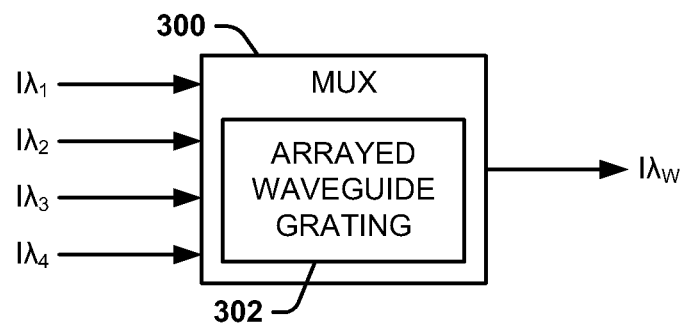
FIG. 3 illustrates an example of an optical multiplexer.

FIG. 3 illustrates an example of an optical multiplexer 300. The multiplexer 300 can correspond to any one or more of the optical multiplexers 262 in the example of FIG. 2. As one example, the optical multiplexer 300 is configured to combine a set of four thin-channel optical input signals, demonstrated in the example of FIG. 3 as optical input signals $I\lambda_1$ through $I\lambda_4$ having different wavelengths into a single wide-channel optical input signal $I\lambda_W$. While the example of FIG. 3 demonstrates four thin-channel optical input signals being combined into the single wide-channel optical input signal, it is to be understood that the optical multiplexer 300 can be configured to combine more or less than four thin-channel optical input signals into the wide-channel optical input signal.

In the example of FIG. 3, the optical multiplexer 300 includes an arrayed waveguide grating (AWG) 302 that is configured to combine the thin-channel optical input signals $I\lambda_1$ through $I\lambda_4$ into the wide-channel optical input signal $I\lambda_W$. The use of the AWG 302 can be based on a variety of design choices and constraints in providing the combination of the thin-channel optical input signals $I\lambda_1$ through $I\lambda_4$ into the wide-channel optical input signal $I\lambda_W$. For example, the AWG 302 can be fabricated in a manner to be passive and insensitive to temperature variations. It is to be understood that, while the example of FIG. 3 demonstrates the use of the AWG 302 for the optical multiplexer 300, an AWG can likewise be implemented for a demultiplexer to split the wide-channel optical input signal $I\lambda_W$ into the plurality of thin-channel optical input signals $I\lambda_1$ through $I\lambda_4$ of different wavelengths.

Figure 4:
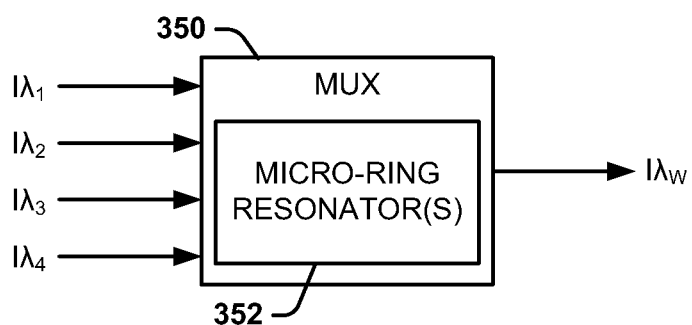
FIG. 4 illustrates another example of an optical multiplexer.

FIG. 4 illustrates another example of an optical multiplexer 350. The multiplexer 350 can correspond to any one or more of the optical multiplexers 262 in the example of FIG. 2. The optical multiplexer 350 is configured to combine a set of four thin-channel optical input signals of different wavelengths, demonstrated in the example of FIG. 4 as optical input signals $I\lambda_1$ through $I\lambda_4$, into a single wide-channel optical input signal $I\lambda_W$. While the example of FIG. 4 demonstrates four thin-channel optical input signals being combined into the single wide-channel optical input signal, it is to be understood that the optical multiplexer 350 can be configured to combine more or less than four thin-channel optical input signals into the wide-channel optical input signal.

The optical multiplexer 350 can include one or more micro-ring resonators 352 that are configured to act as optical filters to combine the thin-channel optical input signals $I\lambda_1$ through $I\lambda_4$ into the wide-channel optical input signal $I\lambda_W$. Similar to as described previously in the example of FIG. 3, the use of the micro-ring resonator(s) 352 can be based on a variety of design choices and constraints in providing the combination of the thin-channel optical input signals $I\lambda_1$ through $I\lambda_4$ into the wide-channel optical input signal $I\lambda_W$. For example, the micro-ring resonator(s) 352 can be fabricated in a more compact manner than the AWG 302 in the example of FIG. 3. For example, by manufacturing the filter rings of the micro-ring resonator(s) 352 to be N times larger than rings used to select individual wavelengths, the micro-ring resonator(s) 352 can have a Free Spectral Range (FSR) of 1/Nth of the smaller rings, and thus can select a subset of N wavelengths. However, the micro-ring resonator (s) 352 implement active optical multiplexing that can require ring tuning (e.g., thermal tuning) to substantially compensate for resonance frequency drift caused by temperature variations.

In yet another example, multiple small rings can be employed as the micro-ring resonator(s) 352 to act as a filter array to provide flexibility in terms of wavelength selection. With a greater number of rings, however, more tuning circuits may be utilized. Using filter arrays, it would also be possible to electronically control the individual micro-ring drop filters, moving them in and out of the active wavelengths to provide a reconfigurable optical multiplexer structure. This would allow dynamic control for the allocation of wavelengths to specific sources and destinations, for example.

Referring back to the example of FIG. 2, the optical switch module 200 can include a wide-channel input signal $I\lambda_{W\_1}$ that is provided directly to an input channel 214 (e.g., the input channel "$P_0$") via a waveguide 254, without being associated with a given optical multiplexer 262 in the optical multiplexer stage 250. Therefore, the photonic packet switch 210 can be configured to receive wide-channel optical input signals directly from an external optical source (e.g., an optical transmitter or router), as well as wide-channel optical input signals resulting from multiplexed thin-channel optical input signals, as described above. Similarly, a wide-channel input signal $I\lambda_{W\_1}$ is provided from an output channel 228 (e.g., the output channel "$P_0$") via a waveguide 256, without being associated with a given optical demultiplexer 264 in the optical demultiplexer stage 260. As an example, the wide-channel optical output signal $O\lambda_{W\_1}$ can be associated with the wide-channel optical input signal $I\lambda_{W\_1}$. However, it is to be understood that the input channel 214 and the output channel 228 on which the optical input signal $I\lambda_{W\_1}$ and optical output signal $O\lambda_{W\_1}$ are provided are not limited to being associated with the same port. In addition, while the example of FIG. 2 demonstrates only a single input channel 214 and single output channel 228 on which the non-multiplexed/demultiplexed wide-channel optical signals $I\lambda_{W\_1}$ and $O\lambda_{W\_1}$ are provided, it is to be understood that a plurality of input channels 214 and a plurality of output channels 228 can be implemented for receiving and transmitting the respective non-multiplexed/demultiplexed wide-channel input and optical output signals $I\lambda_{W\_1}$ and $O\lambda_{W\_1}$, and that the plurality of input channels 214 and output channels 228 are not limited to being equal.

To differentiate between wide-channel optical signals that are and are not input from the optical multiplexer stage 250, and that are and are not output to the optical demultiplexer stage 260, the photonic packet switch 210 includes a channel control component 270. As an example, the channel control component 270 can include a control register having an entry corresponding to each of the input channels 214 and the output channels 228. For example, based on a given binary state of each register corresponding to a respective one of the input channels 214 and the output channels 228, the channel control component 270 can configure the control path for each of the input and/or output channels. For instance, the channel control component 270 can control how the respective input buffers 218 and the output buffers 224 can buffer the data packets of the respective optical input signals and optical output signals and/or how the switch core 220 controls the switching of the respective data packets. Thus, the input buffers 218, the output buffers 224, and/or the switch core 220 can treat the respective input channels 214 and output channels 228 in a different manner for a wide-channel optical signal relative to a combined set of thin-channel optical signals based on the state of the respective registers of the control register in the channel control component 270. Thus, the sets of thin-channel optical signals combined into the wide-channel signals can be treated as separate streams of data, rather than a wide-channel single stream of data for the optical signals $I\lambda_{W\_1}$ and $O\lambda_{W\_1}$. For example, the manner in which the data packets of the input and optical output signals are buffered by the respective input buffers 218 and the output buffers 224 as well as the manner in which the switch core 220 sets the routing logic for the respective data packets can be different for the thin-channel optical signals relative to the wide-channel optical signals, such as based on timing and routing information.

The control register of the channel control component 270 can be provided with a mode signal MODE that can set the entries of the control register, such as during a boot process of the photonic packet switch 210. The mode signal MODE can be provided to the channel control component 270, for example, via a serial connection. As another example, separate mode signals can be provided to set the respective operating mode for each of the input channels 214 and output channels 228. In some examples, the entries of the control register of the channel control component 270 can be set (e.g., hard-coded) based on a designated function of the input channels 214 and output channels 228.

As yet another example, the channel control component 270 can be configured to implement a dynamic discovery of the configuration at each of the respective input channels 214 and output channels 228. Such dynamic discovery can be implemented, for example, if each lane operates independently (e.g., with separate timing information). In this context, a lane refers to an independently controlled wavelength or band of wavelengths that contain a stream of data provided from a node. In the example, of FIG. 2, input signal $I\lambda_{W\_1}$ can contain a plurality of lanes, each of which can correspond to a respective data stream from a common node or from separate nodes. Similarly, each thin channel $I\lambda_1$ through $I\lambda_X$ that is provided to each optical multiplexer 262 can correspond to a lane, which can be provided from one or more respective nodes. However, at each of the input channels 214, there may be no distinction between how lanes have been combined to provide the wide-channel signals for each respective input channel.

As one example, upon initialization of the photonic packet switch 210, the channel control component 270 can command the photonic packet switch 210 to send a separate identification request via each wavelength or groups of wavelengths that are combined to provide the DWDM in the respective wide-channel input and output signals. The identification request thus can be encoded into each lane and provided to the source of each input signals $I\lambda_{W\_1}$ and each $I\lambda_1$ through $I\lambda_X$. In some examples, where the destination of each output signal $O\lambda_{W\_1}$ and $O\lambda_{W\_1}$ through $O\lambda_X$ may differ from the sources of optical input signals, identification requests can be provided separately to the destinations of the output signals. In response, the endpoint(s) that receive the optical identification request signals can respond with unique node identifier data and lane position, which can be received at the respective input channels 214. In this context, the term "lane position" can refer to the mapping of serial data streams from a node to specific wavelengths. The lane position and unique node identifier can thus indicate whether a given lane is part of a single wide-channel optical signal (e.g., $I\lambda_{W\_1}$) or corresponds to (or is part of) a thin-channel optical signal (e.g., for each $I\lambda_1$ through $I\lambda_X$). For example, if multiple input wavelengths have separate nodes but share a single lane for a given input channel 214, then the channel control component 270 can identify that the input channel 214 is receiving a wide-channel optical input signal that has been multiplexed from a plurality of thin-channel optical input signals. Accordingly, the channel control component 270 can implement self-configuration during a boot process of the photonic packet switch 210 to set the control register for each input channel 214 and output channel 228 based on the identified source and destination for each lane.

By combining the photonic packet switch 210 and switch core 220 with integrated CMOS photonics and further employing the optical multiplexer/demultiplexer stages 250 and 260, the optical switch module 200 can function as a very high port count switch, in one example, or as a high port count switch with high-bandwidth DWDM ports in another example. For example, a 128-radix switch integrated circuit (IC) can be combined with a set of multiplexers 262 and demultiplexers 264 that can effectively create a 2048 radix device. As an example, if each port of the 128-radix photonic packet switch 210 implements a quantity 64 λ-wide I/O ports, wherein "wide" refers to a plurality of wavelengths, then the multiplexers 262 and demultiplexers 264 can split the single 64 λ-wide port into 16 separate 4 λ-thin-channel ports. Various other fan-in and fan-out ratios are possible for the multiplexers 262 and demultiplexers 264, as described herein.

Figure 5:
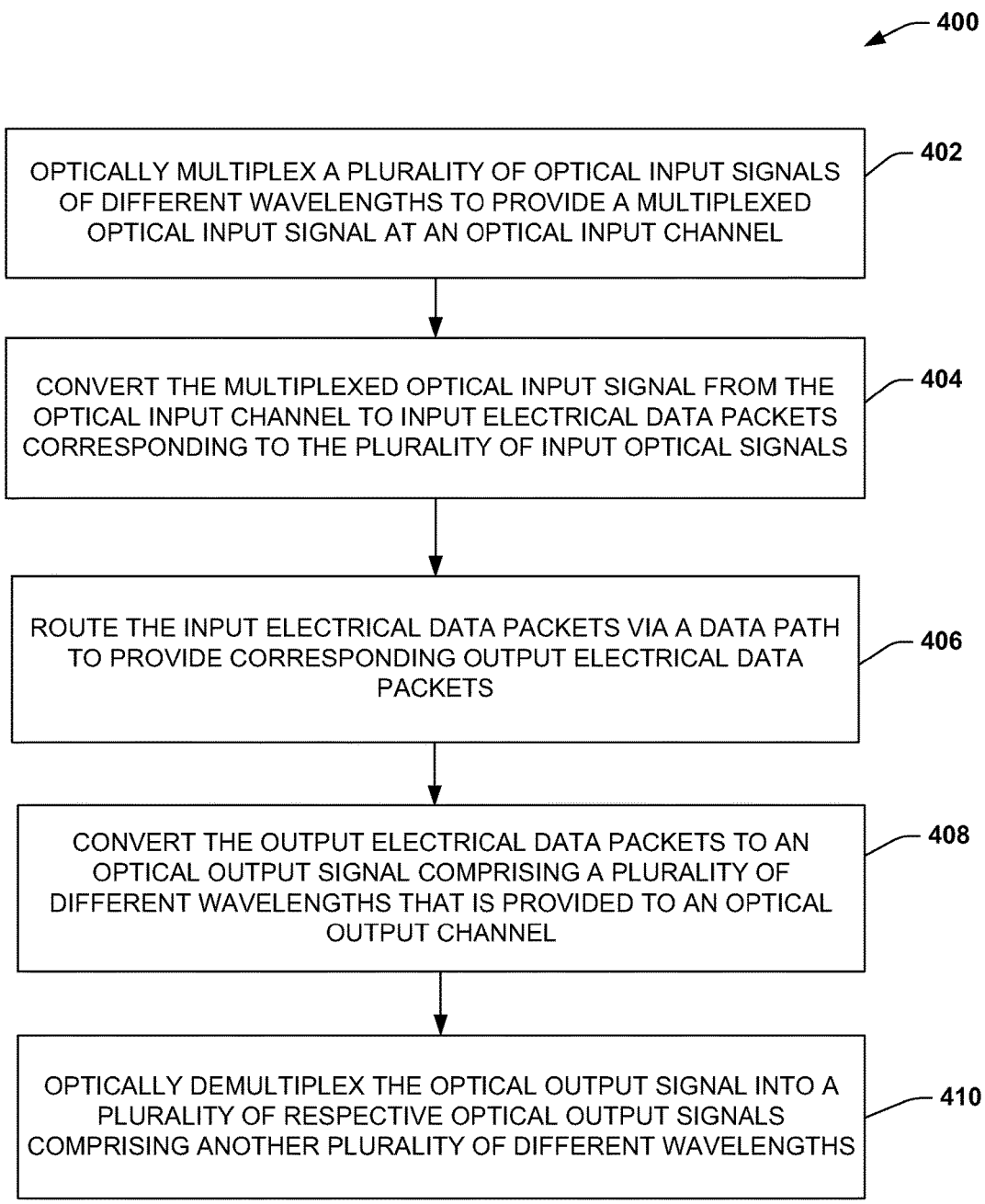
FIG. 5 illustrates an example of a method for increasing the radix of a photonic packet switch.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 5 illustrates an example of a method 400 for increasing the radix of a photonic packet switch. At 402, a plurality of optical input signals (e.g., the optical input signals I$\lambda_1$ through I$\lambda_X$ of FIG. 2) of different wavelengths are optically multiplexed to provide a multiplexed optical input signal (e.g., the wide-channel optical input signal I$\lambda_W$ of FIG. 2) at an optical input channel (e.g., the input channel 214 of FIG. 2). At 404, the multiplexed optical input signal is converted from the optical input channel to input electrical data packets corresponding to the plurality of optical input signals. At 406, the input electrical data packets are routed via a data path to provide corresponding output electrical data packets (e.g., via the switch core 220 of FIG. 2). At 408, the output electrical data packets derived from the input electrical data packets are converted to an optical output signal (e.g., the wide-channel optical output signal O$\lambda_W$ of FIG. 2) comprising a plurality of different wavelengths that is provided to an optical output channel (e.g., the output channel 228 of FIG. 2). At 410, the optical output signal is optically demultiplexed into a plurality of respective optical output signals (e.g., the optical output signals O$\lambda_1$ through O$\lambda_X$) comprising the plurality of different wavelengths.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
   an optical multiplexer to combine a plurality of optical input signals having respective wavelengths into a wide-channel optical input signal that is provided to an input channel;
   a photonic packet switch comprising a switch core and a plurality of ports defining a switch radix of the photonic packet switch, the input channel and an output channel being associated with one of the plurality of ports, the photonic packet switch to process the wide-channel optical input signal and to generate a wide-channel optical output signal that is provided to the output channel; and
   an optical demultiplexer to separate the wide-channel optical output signal into a plurality of optical output signals having respective wavelengths, the optical multiplexer and the optical demultiplexer collectively providing the system with a radix greater than the switch radix, and wherein each of the optical multiplexer and the optical demultiplexer comprises a silicon-arrayed waveguide grating.

2. The system of claim 1, wherein the photonic packet switch comprises:
   an optical-to-electrical (O/E) converter to receive the wide-channel optical input signal for processing an input data packet associated with the wide-channel optical input signal via the switch core; and
   an electrical-to-optical (E/O) converter for transmitting an output data packet associated with the wide-channel optical output signal from the switch core to the output channel.

3. The system of claim 2, wherein the photonic packet switch further comprises:
   an input buffer to receive the wide-channel optical input signal from the O/E converter; and
   an output buffer to transmit the wide-channel optical output signal from the E/O converter to the output channel.

4. The system of claim 3, wherein the photonic packet switch further comprises a channel control component to configure the input buffer for each of a respective plurality of input channels and the output buffer for each of a respective plurality of output channels associated with the plurality of ports to be coupled to or not be coupled to a respective multiplexer and demultiplexer.

5. The system of claim 4, wherein the channel control component is to implement dynamic discovery upon initialization of the photonic packet switch to configure each of the respective plurality of input channels and respective plurality of output channels associated with the plurality of ports.

6. The system of claim 1, wherein each of the optical multiplexer and the optical demultiplexer comprises micro-ring resonators configured as filters.

7. The system of claim 6, wherein filter rings of the micro-ring resonators are configured as N times larger than selection rings used to select individual wavelengths to provide a free spectral range of 1/N between the filter rings and the selection rings to select a subset of N wavelengths, where N is a positive integer.

8. The system of claim 1, wherein the photonic packet switch further comprises:

another input channel that is configured to receive another wide-channel optical input signal directly from an external optical source; and another output channel configured to provide another wide-channel optical output signal directly to an external optical receiver.

9. The system of claim 1, wherein each of the optical multiplexer and the optical demultiplexer comprises one of an interleaver and a multimode interference (MMI) filter.

10. The system of claim 1, wherein the photonic packet switch further comprises:

another input channel that is configured to receive another wide-channel optical input signal directly from an external optical source; and another output channel configured to provide another wide-channel optical output signal directly to an external optical receiver.

11. The system of claim 1, wherein each of the optical multiplexer and the optical demultiplexer comprises one of an interleaver and a multimode interference (MMI) filter.

12. A method comprising:

optically multiplexing a plurality of thin-channel optical input signals of different wavelengths to provide a wide-channel optical input signal to an optical input channel;

converting the wide-channel optical input signal from the optical input channel to input electrical data packets corresponding to the plurality of thin-channel optical input signals;

buffering the input electrical data packets;

processing the buffered input electrical data packets;

routing the input electrical data packets via a data path to provide corresponding output electrical data packets;

converting the output electrical data packets to a wide-channel optical output signal comprising a plurality of different wavelengths that is provided to an optical output channel;

buffering the output electrical data packets; and optically demultiplexing the wide-channel optical output signal into a plurality of respective thin-channel optical output signals comprising another plurality of different wavelengths.

13. The method of claim 12, further comprising buffering the output electrical data packets according to routing logic associated with the output electrical data packets before converting the output electrical data packets to the wide-channel optical output signal.

14. The method of claim 12, further comprising:

filtering the optical input signals to facilitate the optical multiplexing; and filtering the optical output signal to facilitate the optical demultiplexing.

15. A system comprising:

an optical multiplexer to combine optical input signals having respective wavelengths into a wide-channel optical input signal that is provided to a given input channel of a plurality of input channels;

an optical-to-electrical converter to convert the wide-channel optical input signal into input electrical data packets;

an input buffer to receive the input electrical data packets for the given input channel;

a switch core to process the input electrical data packets from the input buffer and to generate corresponding output data packets;

an output buffer to store the output data packets for a given output channel of a plurality of output channels;

an electrical-to-optical converter to generate a wide-channel optical output signal that is associated with the output data packets and that is provided to the given output channel, wherein the wide-channel optical output signal includes a plurality of wavelengths;

an optical demultiplexer to convert the wide-channel optical output signal into a plurality of thin-channel optical output signals each having respective different wavelengths; and a channel control component to configure the input buffer, the switch core, and the output buffer based on a mode signal to control a data path between the given input channel and the given output channel.

16. The system of claim 15, further comprising a channel control component to configure the input buffer for each of a respective plurality of input channels and the output buffer for each of a respective plurality of output channels associated with the plurality of ports to be coupled to or not be coupled to a respective multiplexer and demultiplexer.

17. The system of claim 16, wherein the channel control component is to implement dynamic discovery upon initialization of the photonic packet switch to configure each of the respective plurality of input channels and respective plurality of output channels associated with the plurality of ports.

18. The system of claim 15, wherein each of the optical multiplexer and the optical demultiplexer comprises a silicon-arrayed waveguide grating.

19. The system of claim 15 wherein each of the optical multiplexer and the optical demultiplexer comprises micro-ring resonators configured as filters.

20. The system of claim 19, wherein filter rings of the micro-ring resonators are configured as N times larger than selection rings used to select individual wavelengths to provide a free spectral range of 1/N between the filter rings and the selection rings to select a subset of N wavelengths, where N is a positive integer.

* * * * *